April 1, 1924.
T. R. COOK ET AL
ELECTRIC BATTERY
Filed Dec. 16, 1920
1,488,738
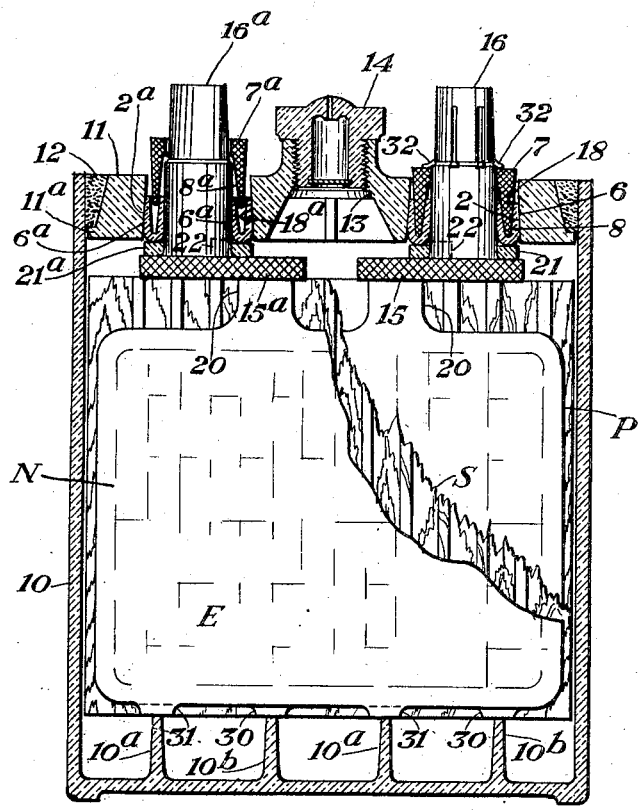

Patented Apr. 1, 1924.

1,488,738

UNITED STATES PATENT OFFICE.

THOMAS R. COOK, OF PITTSBURGH, AND PAUL E. NORRIS, OF WILKINSBURG, PENNSYLVANIA, ASSIGNORS TO WESTINGHOUSE UNION BATTERY COMPANY, OF SWISSVALE, PENNSYLVANIA, A CORPORATION OF PENNSYLVANIA.

ELECTRIC BATTERY.

Application filed December 16, 1920. Serial No. 431,124.

*To all whom it may concern:*

Be it known that we, THOMAS R. COOK and PAUL E. NORRIS, citizens of the United States, residing at Pittsburgh and Wilkinsburg, respectively, in the county of Allegheny and State of Pennsylvania, have invented certain new and useful Improvements in Electric Batteries, of which the following is a specification.

Our invention relates to electric batteries, and is particularly well adapted for batteries of the secondary or storage type though not necessarily limited thereto.

The present application is a continuation of our co-pending application filed on or about the 10th day of March, 1920, Serial No. 364,795, for improvements in terminal structure for electric batteries, in so far as the subject matter common to the two is concerned.

We will describe one form of battery structure embodying our invention, and will then point out the novel features thereof in claims.

The accompanying drawing is a view showing in vertical section one form of battery structure embodying our invention.

Referring to the drawing, the battery comprises a jar 10, usually of glass or hard rubber, and a cell cover 11, usually of hard rubber, fitting inside the jar and rigidly attached thereto by sealing compound 12. As here shown, the rim of the cell cover is provided with a flange $11^a$, and the rim slopes inwardly from the flange to the top surface of the cover, thus providing a channel which is wider at the top than at the bottom to receive the sealing compound. The cell cover 11 is provided with two round terminal post holes 2 and $2^a$, and with a vent hole 13 closed by a vent plug 14.

Located within the jar 10 is a battery element E, comprising a group of positive plates and a group of negative plates, with a separator between each two adjacent plates. One positive plate is shown at P, and one negative plate at N, the separator between these plates being shown at S. The plates are partly supported, as usual, on ribs or plate rests $10^a$ and $10^b$, which are located at the bottom of the jar and are preferably integral therewith. As here shown, each negative plate N is provided with two feet 31, 31 which rest on the ribs $10^a$, $10^a$, and each positive plate P is provided with two feet 30, 30 which rest on the ribs $10^b$, $10^b$. All of the positive plates P are rigidly attached to a connecting strap 15, while all of the negative plates N are rigidly attached to a similar strap $15^a$, both straps being of electro-conductive material, such as antimony lead. Each plate is provided with an upstanding lug 20 for attachment to the corresponding strap in the usual manner. The positive connecting strap 15 is provided with a positive terminal post 16 which is usually integral with the strap and in all cases is rigidly attached thereto, and which post extends upwardly through the hole 2 in the top plate 11. The upper portion of this post is preferably tapered, as shown. The negative connecting strap $15^a$ is provided with a similar negative terminal post $16^a$ which extends upwardly through the hole $2^a$ in the top plate 11. It will be noted that each terminal post is considerably smaller in diameter than the hole in the top plate through which it passes, leaving an annular clearance space between the post and the hole.

Each connecting strap 15 and $15^a$ is provided with two upstanding lugs 22 (one behind the other in the drawing) which serve as rests for the cell cover 11, although the cover is not fastened to them in any way.

The positive terminal post 16 is surrounded by a sleeve-like gasket 6 which rests on an annular gasket 21, and which latter in turn rests on the upper surface of the connecting strap 15. Each of these gaskets is of resilient material, such, for example, as soft rubber. Gasket 6 is provided with an annular V-shaped recess 18 which extends from the top well down towards the bottom of the gasket. Also surrounding the post 16 is a gland follower 7 the lower end of which constitutes a circular wedge-like or V-shaped projection 8 adapted to enter the recess 18 in the gasket 6.

The structure adjacent the negative terminal post, $16^a$ is the same as that adjacent the positive terminal post, the parts being designated by the same reference characters with the addition of the exponent $a$. The follower $7^a$ is shown in elevated position on its post to illustrate more clearly the shapes of the various parts and the manner in which the structure is assembled. All of the following discussion concerning the positive post 16 and its adjacent structure applies equally well to the negative post 16ᵃ and its adjacent structure.

To assemble the battery, the element E, comprising the plates, separators and connecting straps, is first built up in the usual manner and inserted as a whole in jar 10, and the cover 11 is then placed in position and sealed. The gaskets 6 and 21 are next placed in the positions shown on the post 16, and the follower 7 is then driven downwardly on the post, thereby spreading the gasket 6 against the post and the wall of hole 2 with considerable force. To retain the follower in place on the post, a tool is driven down on the post, which tool has a plurality of shoulders each arranged to force a portion of the material of the posts downwardly, thereby forming lugs 32 which rest against the top of the follower and prevent the latter from rising on the post.

When it becomes necessary to renew the packing, the lugs 32 are chipped or filed off, the follower 7 is withdrawn, gaskets 6 and 21 are replaced by new gaskets, and the follower is again forced into position and locked there in the same manner as before. During this renewal procedure no part of the structure except the gaskets need be destroyed or damaged in any way.

It will be noted that the holes 2 and 2ᵃ in cover 11 are tapered, being smaller in diameter at the top than at the bottom. The reason for this is to facilitate disassembling if the rubber gaskets 6 and 21 should dry up and "freeze" to the cell cover, terminal post and follower 7, so that the follower cannot be drawn out. In such event, a torch flame can be applied to the upper end of terminal post 16, and sufficient heat will be carried down the post to melt gasket 6 or reduce it to a spongy mass, whereupon the cover 11 can be lifted away from the gasket and terminal post without difficulty.

It will be observed that the walls of the recess 18 in gasket 6 form acute angles with the vertical, that is, with the line of longitudinal movement of the follower 7, and that the sides of the projection 8 on the follower form substantially these same angles with the vertical. The result of this construction is that a comparatively great longitudinal movement of the follower causes a comparatively small variation in the pressure of the gasket against the terminal post and cell cover, so that the desired pressure can be accurately attained. It also follows, of course, that this pressure may be made comparatively great, if desired, by a comparatively small amount of force applied to the followed in the direction of its longitudinal movement. One important feature of the structure shown in Fig. 1 is the effective sealing of the terminal by only one sealing gasket, thus reducing the number of parts to the minimum, and effectively preventing the loss of electrolyte through the hole 2.

Another important feature of this structure is as follows: Storage batteries which are used for some purposes are subjected to severe shocks and considerable vibration, this being particularly true of batteries carried by automobiles, motor trucks, aeroplanes, etc. Prior to our invention it was customary to provide a rigid connection between the terminal post and the cell cover, but this construction has resulted in frequent breakage of the terminal post due to vibration of the plates and to sudden movements of the plates under severe shocks. With the construction shown in Fig. 1, however, it will be observed that the resilient gaskets 6 and 21 form the only connection between terminal post and cell cover; these gaskets absorb shocks and vibration and so the structure is not subject to the danger of breakage of the terminal post by such forces.

Although we have herein shown and described only one form of battery structure embodying our invention, it is understood that various changes and modifications may be made therein within the scope of the appended claims without departing from the spirit and scope of our invention.

Having thus described our invention, what we claim is:

1. In an electric battery, a cell cover provided with a hole, a terminal post projecting through said hole, a gasket surrounding said post and having a circular recess, a follower sleeved on said post, said follower having a circular wedge-shaped projection on its lower end adapted to enter the recess in said gasket to spread the gasket against the terminal post and the wall of said hole, and means for locking said follower in place on said post.

2. An electric battery comprising a jar, a cell cover attached to said jar and provided with a hole, a plate located in said jar and provided with a terminal post projecting through said hole in the cell cover but out of contact with the cover, a follower sleeved on said post and out of contact with said cover, the lower end of said follower constituting a circular wedge-like projection the sides of which form acute angles with the vertical, and a gasket surrounding said post and having in its upper end a circular recess adapted to receive said projection on the follower.

3. An electric battery comprising a jar, a cell cover attached to said jar and provided with a hole, a plate located in said jar and provided with a terminal post projecting through said hole in the cell cover but out of contact with the cover, a gasket of resilient material between said post and the wall of said hole, and means for spreading said gasket against both the post and the hole wall.

4. An electric battery comprising a jar, a cell cover attached to said jar and provided with a hole, a plate located in said jar and provided with a terminal post projecting through said hole in the cell cover but free from said cover, a follower sleeved on said post and out of contact with the cell cover, the lower end of said follower constituting a wedge-like projection the sides of which form acute angles with the vertical, a gasket surrounding said post and having in its upper end a circular recess adapted to receive said projection on the follower, and means for locking said follower in place on said post.

5. An electric battery comprising a jar, a cell cover attached to said jar, and provided with a hole, a plate located in said jar and attached to a connecting strap, a terminal post fixed to said strap and projecting through said hole in the cell cover but out of contact with said cover, a follower sleeved on said post and out of contact with said cover, the lower end of said follower constituting a circular wedge-like projection, an annular gasket surrounding said post and resting on said connecting strap, and a sleeve-like gasket surrounding said post and resting on said first-mentioned gasket, said sleeve-like gasket having a circular recess extending downwardly from its upper end and adapted to receive the wedge-like projection on the follower.

6. An electric battery comprising a cell cover provided with a hole, a connecting strap having a terminal post projecting through said hole but out of contact with said cell cover, a follower sleeved on said post and out of contact with the cell cover, the lower end of said follower constituting a circular wedge-like projection, an annular gasket surrounding said post and resting on said connecting strap, a sleeve-like gasket also surrounding said post and resting on the first-mentioned gasket, said sleeve-like gasket having a circular recess extending downwardly from its upper end and adapted to receive the wedge-like projection on the follower.

7. An electric battery comprising a cell cover provided with a hole, a terminal post projecting through said hole, a gasket of resilient material interposed between said post and the wall of said hole, and a follower sleeved on said post and engaging said gasket, portions of said post being forced downwardly to form lugs which engage said follower and hold it in place.

8. An electric battery comprising a cell cover provided with a hole, a terminal post projecting through said hole, an annular gasket supported by said post, a sealing gasket sleeved on said post and supported by said annular gasket, and means supported solely by said post for spreading said sealing gasket laterally against the post and the cell cover.

9. In an electric battery, an apertured cell cover, a terminal post passing through the aperture, an annular gasket supported by said post, a sealing gasket surrounding said post and resting on said annular gasket, said sealing gasket having a circular recess extending downwardly from its upper end, and a follower sleeved on said post and having a circular projection on its lower end adapted to enter the recess in said sealing gasket.

10. In an electric battery, in combination, a cell cover provided with a hole, a terminal post projecting through said hole and out of contact with said cover throughout the length of the hole, a follower in contact with said post and out of contact with said cover, and resilient sealing means between said follower and said cover, and between said follower and said post.

11. In an electric battery, in combination, a cell cover provided with a hole, a terminal post projecting through said hole and out of contact with said cover throughout the length of the hole, a circular wedge-shaped follower in contact with said post and out of contact with said cover, and resilient sealing means between said follower and said cover, and between said follower and said post.

12. In an electric battery, in combination, a cell cover provided with a hole, a terminal post projecting through said hole and out of contact with said cover throughout the length of the hole, a follower in contact with said post and out of contact with said cover, and a resilient ring-shaped gasket having an annular recess between said follower and said cover and between said follower and said post.

13. In an electric battery, in combination, a cell cover provided with a hole, a terminal post projecting through said hole and out of contact with said cover throughout the length of the hole, a circular wedge-shaped follower in contact with said post and out of contact with said cover, and a resilient ring-shaped gasket having an annular recess between said follower and said cover and between said follower and said post.

14. In an electric battery, in combination, a cell cover provided with a hole, a terminal post projecting through said hole and out of contact with said cover throughout the length of the hole, a ring-shaped gasket sleeved on said post and having an annular recess extending from its upper end to a point near its lower end, and a follower sleeved on said post and out of contact with said cover, the lower end of said follower constituting a circular wedge adapted to enter the recess in said gasket.

15. In an electric battery, in combination, a cell cover provided with a hole, a terminal post projecting through said hole and out of contact with said cover throughout the length of the hole, a gasket sleeved on said post, and a follower also sleeved on said post and out of contact with said cover for spreading said gasket against the post and the wall of said cell cover hole.

16. An electric battery comprising a cell cover provided with a hole tapering from a small diameter at the top to a large diameter at the bottom, a terminal post projecting through said hole and out of contact with said cover, a follower sleeved on said post and out of contact with said cover, and a resilient gasket between said follower and said cover and between said follower and said post.

17. An electric battery comprising a cell cover provided with a hole tapering from a large diameter at the bottom to a small diameter at the top, a terminal post projecting through said hole and out of contact with said cover, a ring-shaped gasket sleeved on said post and having an annular recess extending from its upper end to a point near its lower end, and a follower sleeved on said post and out of contact with said cover, the lower end of said follower constituting a circular wedge adapted to enter the recess in said gasket.

In testimony whereof we affix our signatures.

THOMAS R. COOK.
PAUL E. NORRIS.